(12) United States Patent
Buzzi

(10) Patent No.: US 8,347,712 B2
(45) Date of Patent: Jan. 8, 2013

(54) BALANCING MACHINE FOR ROTATING BODIES, PARTICULARLY FOR MOTOR VEHICLE WHEELS

(76) Inventor: Carlo Buzzi, Mandello Del Lario (IT)

( * ) Notice: Subject to any disclaimer, the term of this patent is extended or adjusted under 35 U.S.C. 154(b) by 674 days.

(21) Appl. No.: 12/449,005

(22) PCT Filed: Jan. 25, 2008

(86) PCT No.: PCT/EP2008/050860
§ 371 (c)(1),
(2), (4) Date: Jul. 20, 2009

(87) PCT Pub. No.: WO2008/095792
PCT Pub. Date: Aug. 14, 2008

(65) Prior Publication Data
US 2010/0043545 A1 Feb. 25, 2010

(30) Foreign Application Priority Data
Feb. 7, 2007 (IT) .............................. MI2007A0222

(51) Int. Cl.
*G01M 1/16* (2006.01)
*G01M 1/22* (2006.01)
(52) U.S. Cl. ................................. 73/459; 73/462; 73/471
(58) Field of Classification Search .................... 73/460, 73/462, 468, 459, 487, 471, 472, 473
See application file for complete search history.

(56) References Cited

U.S. PATENT DOCUMENTS

| 3,812,725 | A | * | 5/1974 | Frank et al. ..................... 73/462 |
| 4,250,756 | A | * | 2/1981 | Maus .............................. 73/459 |
| 4,254,658 | A | | 3/1981 | Kogler et al. |
| 4,445,372 | A | * | 5/1984 | Buzzi .............................. 73/459 |
| 5,900,548 | A | * | 5/1999 | Buzzi .............................. 73/487 |
| 6,581,463 | B1 | | 6/2003 | Colarelli, III et al. |
| 2003/0061719 | A1 | | 4/2003 | Gerdes |
| 2003/0213301 | A1 | | 11/2003 | Buzzi |

FOREIGN PATENT DOCUMENTS

| EP | 0 058 860 A1 | | 9/1982 |
| EP | 0766078 | * | 4/1997 |
| EP | 0897107 | * | 2/1999 |

* cited by examiner

*Primary Examiner* — Helen C. Kwok
(74) *Attorney, Agent, or Firm* — Modiano & Associati; Albert Josif; Daniel O'Byrne

(57) ABSTRACT

A balancing machine for rotating bodies, particularly for wheels of motor vehicles and the like, including a rotating shaft supported by a supporting element which is connected rigidly to the frame of the balancing machine, at least one first measurement transducer and one second measurement transducer being coupled elastically, along perpendicular planes, to an extension of the supporting element, an actuation motor being connected to the rotating shaft by means of a belt, the actuation motor being connected on an extension of the supporting element, and the extension connecting the rotating shaft to the measurement transducers.

3 Claims, 2 Drawing Sheets excellent # BALANCING MACHINE FOR ROTATING BODIES, PARTICULARLY FOR MOTOR VEHICLE WHEELS The present invention relates to a balancing machine for rotating bodies, particularly for motor vehicle wheels.

BACKGROUND OF THE INVENTION

As is known, in balancing machines, the rotating body, and in particular the wheel of a motor vehicle, is fitted on one end of a shaft which is turned and is supported by a frame provided with force transducers adapted to measure the centrifugal force generated by the imbalances present on the rotating body.

The frame that supports the shaft is fixed generally to the base of the machine by way of relatively elastic systems, which are capable of providing degrees of freedom to the movement of such frame. The degrees of freedom are locked by force transducers.

In this manner, it is possible to obtain from the transducers a signal which corresponds to the forces which are induced by the imbalance present on the motor vehicle wheel and are discharged onto the basic structure of the balancing machine.

The rotating body is turned at the speed needed for measurement by using electric motors connected to the shaft by means of belts and pulleys or a motor which is mounted in axial alignment with the rotating body.

The system with motor and belt drive is considered convenient, since the drive allows to reduce the selected rotation rate for the proper operation of the balancing machine.

Measurement of the imbalance in fact can be obtained correctly from a speed on the order of 80-100 rpm of the rotating body, while a normal electric motor has a much higher speed.

By means of the reduction that can be obtained from the belt, it is possible to use a motor of limited power which is therefore less expensive.

However, the solution described above suffers the drawback that the vibration generated by the rotating belt or by the eccentricity of the driving pulley affects negatively the measurement of the imbalance forces.

Solutions are known in which the transducers have measurement axes which are substantially parallel to each other and contrast the movement of the frame suspended on relatively flexible springs.

This shape of the frame of the balancing machine allows to mount the motor so that it is laterally adjacent to the frame or mounted on board the frame. This embodiment with transducers having parallel axes, however, suffers drawbacks due to complexity and construction and to the difficulty in obtaining from the transducers signals which can be correlated easily to the forces generated by the imbalances.

Therefore, also the above described solution suffers drawbacks.

SUMMARY OF THE INVENTION

The aim of the present invention is to provide a balancing machine for rotating bodies, particularly for wheels of motor vehicles and the like, which allows to eliminate vibration and the forces generated by the driving belt and by the eccentricity of the pulley.

Within this aim, an object of the present invention is to provide a balancing machine for rotating bodies, particularly for wheels of motor vehicles and the like, in which the measurements of the imbalance forces are not affected by vibration generated by the rotating belt or by the eccentricity of the driving pulley.

Another object of the present invention is to provide a balancing machine for rotating bodies, particularly wheels of motor vehicles and the like, in which it is not necessary to perform a filtering, which is costly in terms of measurement time, of the signal generated by the measurement sensors.

Still another object of the present invention is to provide a balancing machine for rotating bodies, particularly for wheels of motor vehicles and the like, which is highly reliable, relatively simple to provide and at competitive costs.

This aim and these and other objects, which will become better apparent hereinafter, are achieved by a balancing machine for rotating bodies, particularly for wheels of motor vehicles and the like, comprising a rotating shaft supported by a supporting element which is connected rigidly to the frame of said balancing machine, at least one first measurement transducer and one second measurement transducer being coupled elastically, along perpendicular planes, to an extension of said supporting element, an actuation motor being connected to said rotating shaft by means of a belt, characterized in that said actuation motor is mounted on an extension of said supporting element, said extension connecting said rotating shaft to said measurement transducers.

BRIEF DESCRIPTION OF THE DRAWINGS

Further characteristics and advantages of the invention will become better apparent from the description of a preferred but not exclusive embodiment of the balancing machine according to the present invention, illustrated by way of non-limiting example in the accompanying drawings, wherein:

FIG. 1b is a side elevation view of the balancing machine of the known type of FIG. 1a;

DESCRIPTION OF THE PREFERRED EMBODIMENTS

Figure 1A:
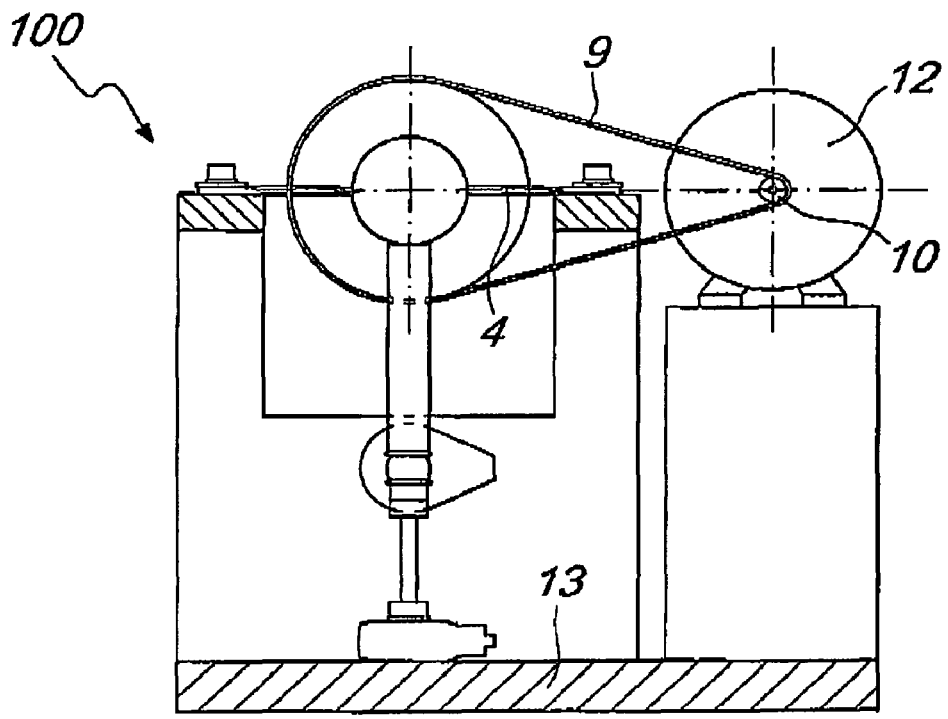
FIG. 1a is a front view of a balancing machine of a known type.
Figure 1B:
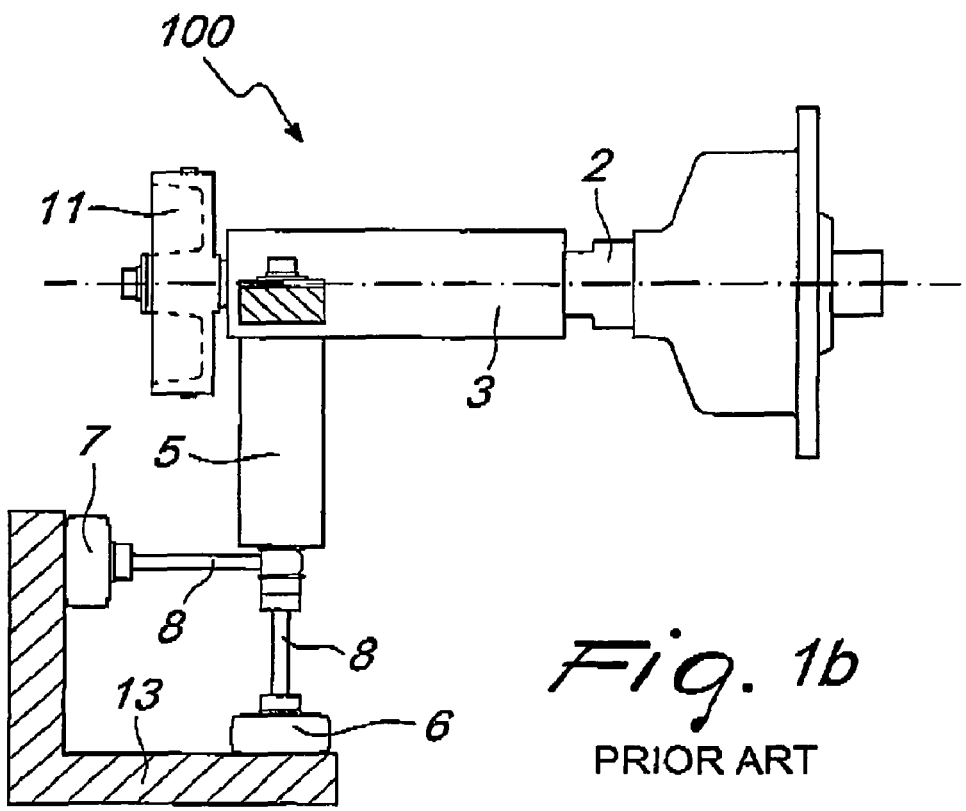

With reference to the figures, in which identical reference numerals correspond to identical elements in all the figures, the balancing machine according to the invention is designated by the reference numeral 1, while the known type of balancing machine is designated by the reference numeral 100.

With reference to the figures, the balancing machine for rotating bodies comprises a rotating shaft 2 on part of a support 3, which is connected to the structure or frame of the balancing machine by means of laminas 4. An extension 5 of the support 3 allows to fix at least one first and one second transducers 6 and 7 by means of relatively elastic tension elements 8. In this manner, the structure is rigid and has two constraints which correspond to the force measurement transducers 6 and 7. The forces generated on the support 3, therefore, are detected efficiently by the transducers 6 and 7. A driving belt 9 transmits and generates in its movement forces between a driving pulley 10 and a balancing pulley 11.

Figure 2A:
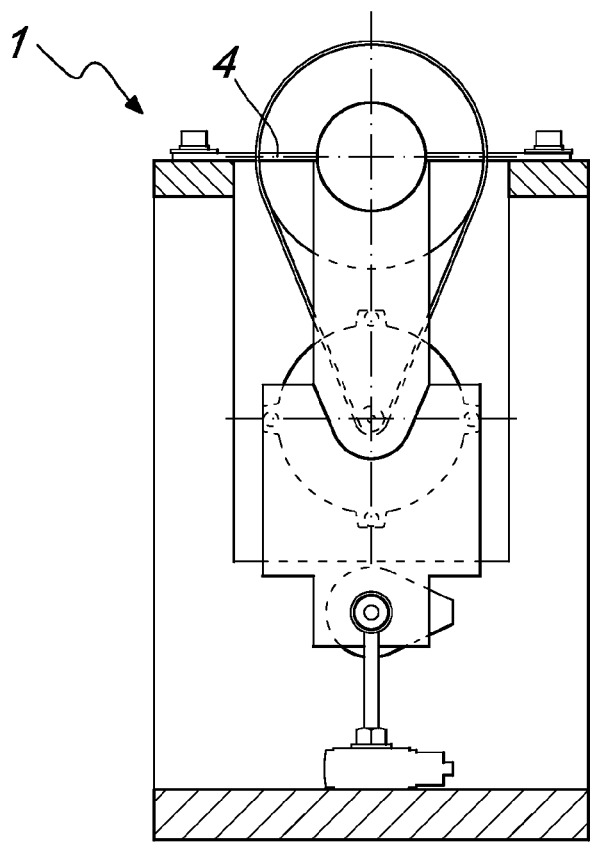
FIG. 2a is a front view of a balancing machine according to the present invention.
Figure 2B:
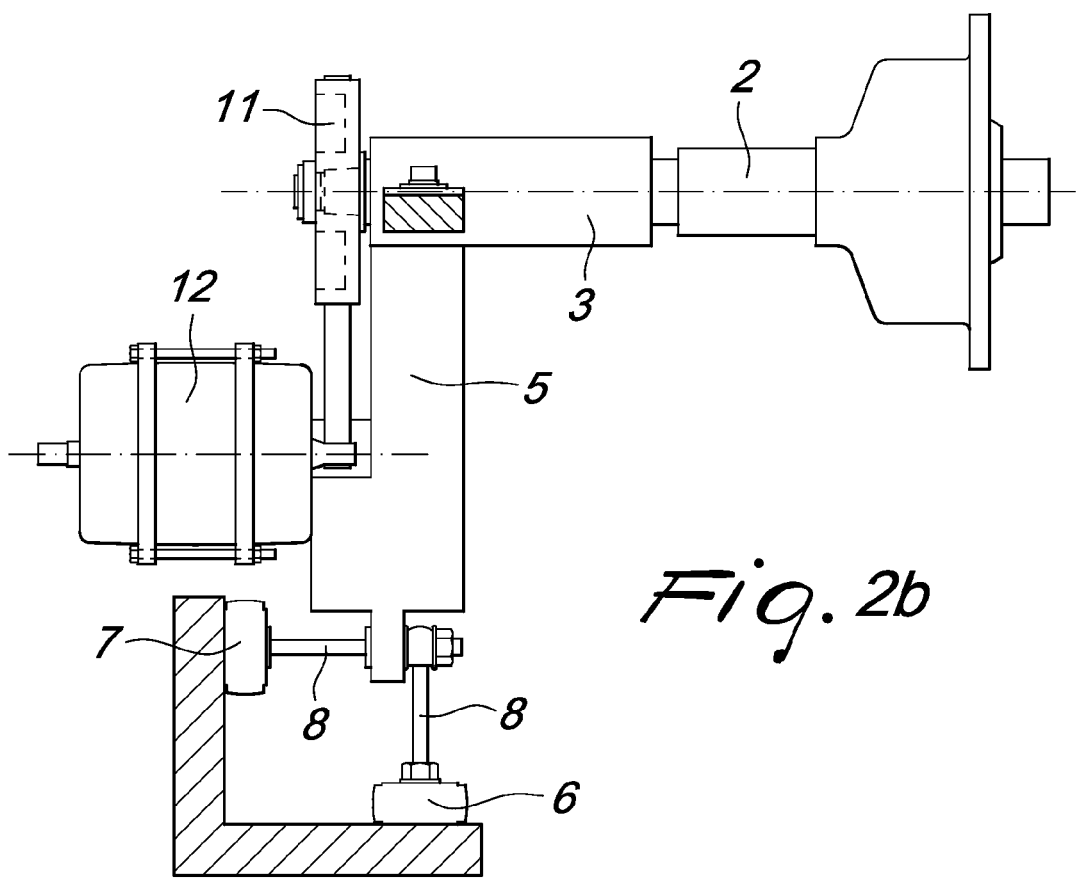
FIG. 2b is a side elevation view of the balancing machine according to the present invention.

Differently from the solution indicated in FIG. 1a, in which a motor 12 is mounted laterally with respect to the measurement frame on the base 13 of the balancing machine, in the balancing machine according to the invention, shown in FIGS. 2a and 2b, the motor 12 is mounted directly on the extension 5 of the support 3 and is thus suspended together with the entire measurement system.

In this manner, the forces produced by the belt 9 and exchanged between the driving pulley 10 and the driven pulley 11 are supported by a rigid mechanical element, i.e., the extension or supporting element 5 of the motor 12, which is connected to the support 3 proximate to the bearing, which in turn supports the driven pulley 11.

In this manner, the forces due to the belt are in no way detectable by the transducers 6 and 7 and do not influence them, since they are mounted outside the path of said forces.

Substantially, the reaction to the forces due to the belt 9 is closed in a very specific mechanical path without being able to influence the measurement of the imbalance forces.

The balancing machine described above is simple and effective to manufacture; it is in fact absolutely simple to align the motor axis with the shaft axis, since both lie on a single structure and are therefore mutually rigidly coupled.

In practice, the motor 12 is mounted on the extension that connects the rotating shaft 2 to the measurement transducers 6 and 7 and the motor is further placed in an intermediate position between the transducers 6 and 7 and the rotating shaft 2.

In practice it has been found that the balancing machine according to the present invention fully achieves the intended aim and objects, since it allows to obtain a measurement of the balance forces and is in no way affected by the vibration generated by the rotating belt or by the eccentricity of the driving pulley.

Moreover, the machine thus conceived is simple and reliable to manufacture, and maintenance interventions can also be performed very simply.

The balancing machine thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application No. MI2007A000222 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A balancing machine for rotating bodies, particularly for wheels of motor vehicles, comprising
a rotating shaft supported by a supporting element which is connected rigidly to a frame of said balancing machine,
a first measurement transducer and a second measurement transducer being coupled elastically, alone perpendicular planes, to an extension of said supporting element, said supporting element being connected to said frame by means of laminas that are arranged on a plane passing through a rotation axis of said rotating shaft, and said extension connecting said rotating shaft to said first and second measurement transducers,
an actuation motor being connected to said rotating shaft by means of a belt,
said actuation motor is being mounted on the extension of said supporting element in an intermediate position on the extension between said first and second measurement transducers and said rotating shaft.

2. A balancing machine for rotating bodies, particularly for wheels of motor vehicles, comprising
a rotating shaft supported by a supporting element which is connected rigidly to a frame of said balancing machine,
a first measurement transducer and a second measurement transducer being coupled elastically, alone perpendicular planes, to an extension of said supporting element, said supporting element being connected to said frame by means of laminas that are arranged on a plane passing through a rotation axis of said rotating shaft, and said extension connecting said rotating shaft to said first and second measurement transducers,
an actuation motor being connected to said rotating shaft by means of a belt,
said actuation motor being mounted on the extension of said supporting element in an intermediate position on the extension between said first and second measurement transducers and said rotating shaft,
said actuation motor being suspended from said laminas together with said support and said extension and said measurement transducers.

3. A balancing machine for rotating bodies, particularly for wheels of motor vehicles, comprising
a rotating shaft supported by a supporting element which is connected rigidly to a frame of said balancing machine,
a first measurement transducer and a second measurement transducer being coupled elastically, along perpendicular planes, to an extension of said supporting element, said supporting element being connected to said frame by means of laminas that are arranged on a plane passing through a rotation axis of said rotating shaft, and said extension connecting said rotating shaft to said first and second measurement transducers,
an actuation motor being connected to said rotating shaft by means of a belt,
said actuation motor being mounted on the extension of said supporting element in an intermediate position on the extension between said first and second measurement transducers and said rotating shaft,
said actuation motor being suspended from said laminas together with said support and said extension and said measurement transducers,
said rotation axis of said rotating shaft and a rotation axis of said actuation motor extending in a plane that is perpendicular to the plane on which said laminas are arranged,
said measurement transducers being connected to said extension by means of elastic tension elements having respective perpendicular longitudinal axes extending in the plane in which said rotation axes of said rotating shaft and said actuation motor are arranged.

* * * * *